United States Patent

Chenel et al.

[15] 3,642,605
[45] Feb. 15, 1972

[54] APPARATUS FOR THE EXTRACTION AND DEHYDRATION OF A SOLID PHASE FROM A LIQUID DISPERSION

[72] Inventors: Francois Chenel, Le Cateau; Richard Louis Swinnen, Gennevilliers, both of France

[73] Assignee: Societe Generale Ceramique du Batiment, Luxembourg

[22] Filed: Jan. 23, 1968

[21] Appl. No.: 699,918

[30] Foreign Application Priority Data

Jan. 24, 1967 France....................................92303
Jan. 24, 1967 France....................................92304

[52] U.S. Cl..............................................204/300, 204/180
[51] Int. Cl...............................................B01k 5/00
[58] Field of Search...................204/300, 180, 181, 299, 301

[56] References Cited

UNITED STATES PATENTS

| | | | |
|---|---|---|---|
| 1,435,886 | 11/1922 | Acton & MacKean | 204/300 |
| 2,440,504 | 4/1948 | Fisher et al. | 204/300 |
| 2,500,878 | 3/1950 | Sieling | 204/300 |
| 2,099,873 | 11/1937 | Sternfels | 204/216 |
| 3,287,248 | 11/1966 | Braithwaite | 204/262 |
| 2,406,820 | 4/1943 | Fisher et al. | 204/300 |
| 2,865,795 | 12/1958 | Morrison, Jr. | 117/218 |
| 3,424,663 | 1/1969 | Weigel | 204/181 |

FOREIGN PATENTS OR APPLICATIONS 520,481 10/1938 Great Britain.........................204/300

OTHER PUBLICATIONS

*The Electrochemical Society* Preprint 81-13 Electrophoretic Dewatering of Clay by Sidney Speil & M. R. Thompson (pp. 145-149; 161-170)
*Perry's Chemical Engineers' Handbook* 4th Ed. pp. 11-45, 11-46

Primary Examiner—John H. Mack
Assistant Examiner—Neil A. Kaplan
Attorney—Cushman, Darby & Cushman

[57] ABSTRACT

Apparatus for the removal of a solid phase from its dispersion by electrophoretic deposition and heat using an electrically charged vessel for the dispersion and a moving electrode or rotating drum emerging from the dispersion is disclosed. An aqueous layer is removed from the surface of the deposited solid phase by a satellite roller in contact with the rotating drum, the drum continues to rotate, then a scraper removes the deposited solid phase from the drum before it again enters the dispersion.

10 Claims, 8 Drawing Figures

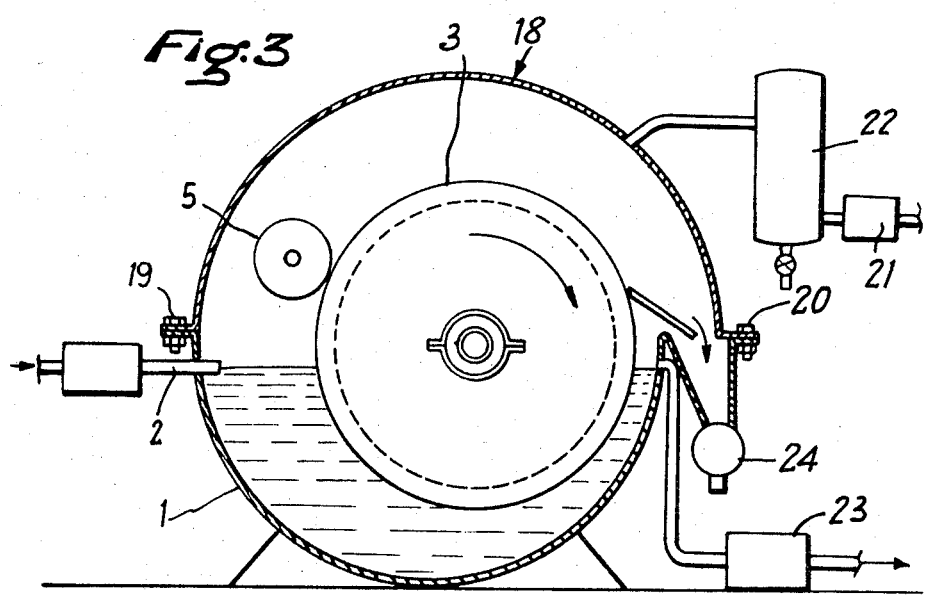
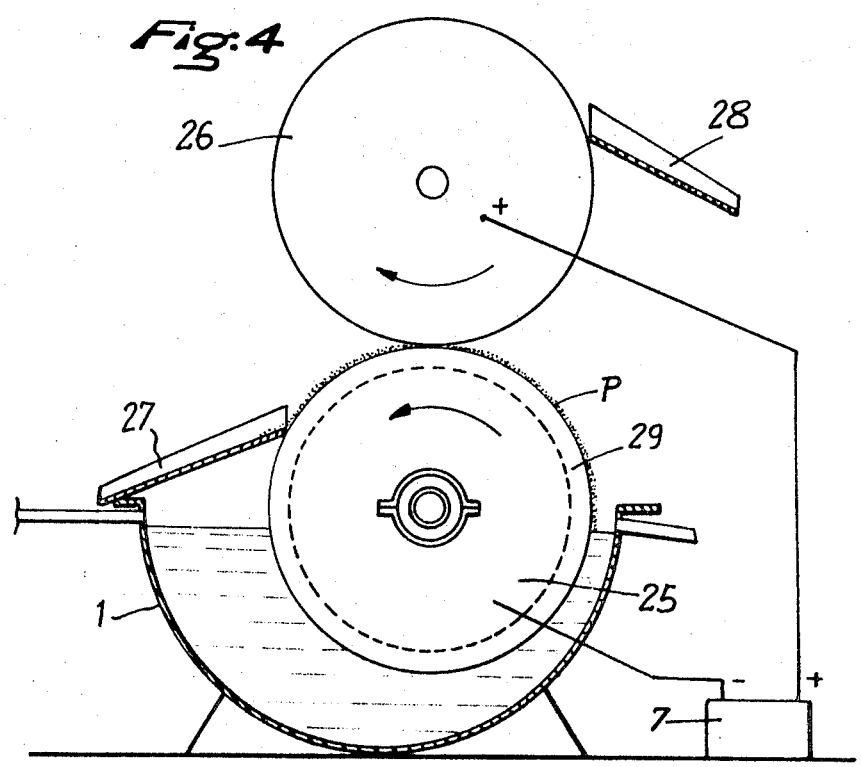

APPARATUS FOR THE EXTRACTION AND DEHYDRATION OF A SOLID PHASE FROM A LIQUID DISPERSION

The present invention relates to the separation and hardening of a dispersed solid phase, for the purpose of obtaining a powder, paste, or, more generally, a dispersion in which the solid phase is sufficiently concentrated to enable it to undergo certain subsequent treatments, such as mixing or, sifting. Such a dehydrating operation is, in particular, currently practiced on ceramic mixtures hereinafter referred to as barbotines, but it must be understood that the scope of application of the invention is by no means limited to the ceramic industry. The concentration and drying of barbotines was carried out, in the prior art, either through direct drying by means, for example, of an atomizer or a drying cylinder or by passage in the filter press followed by ovendrying and milling.

These processes suffer from various drawbacks: the filter press operates on a discontinuous basis and the overall operations of passing in the filter press, ovendrying and milling are lengthy and require considerable manpower.

Direct drying is carried out in a single continuous operation, but involves a large expenditure of energy due to the fact that all of the water to be eliminated is evaporated by supplying heat. The present invention is adapted to provide an apparatus which combines the advantage peculiar to the filter press, i.e., that of eliminating, through mechanical separation, a large part of the liquid phase without the appreciable supply of energy required by the change of state of the latter, and the advantage peculiar to direct drying, which is a continuous process requiring few manipulations.

The invention has therefore for its object an apparatus comprising a vessel for containing the dispersion, at least one rotative cylinder or drum having an unperforated surface portion emerging from the dispersion whereby a layer containing the solid phase is formed on said surface portion, said surface portion being electroconductive, said apparatus further comprising a source of direct electric current for applying a voltage to said surface portion, whereby said layer comprises the concentrated solid phase electrophoretic deposit with a liquid film at the outside surface thereof, characterized by a satellite roller arranged in contact with the said surface portion, for removing the said liquid film and by first and second scrapers respectively mounted for cooperation with said satellite roller and with said rotative cylinder.

The advantages and features of the invention will become apparent from the following detailed description.

In the appended drawings:

FIG. 3 is a schematic representation of another embodiment of the apparatus which is to operate under vacuum, FIG. 4 is a diagram of still another embodiment of the apparatus and FIG. 5 is a partial schematic view of an apparatus modified so as to carry out a granulation.

Figure 1:
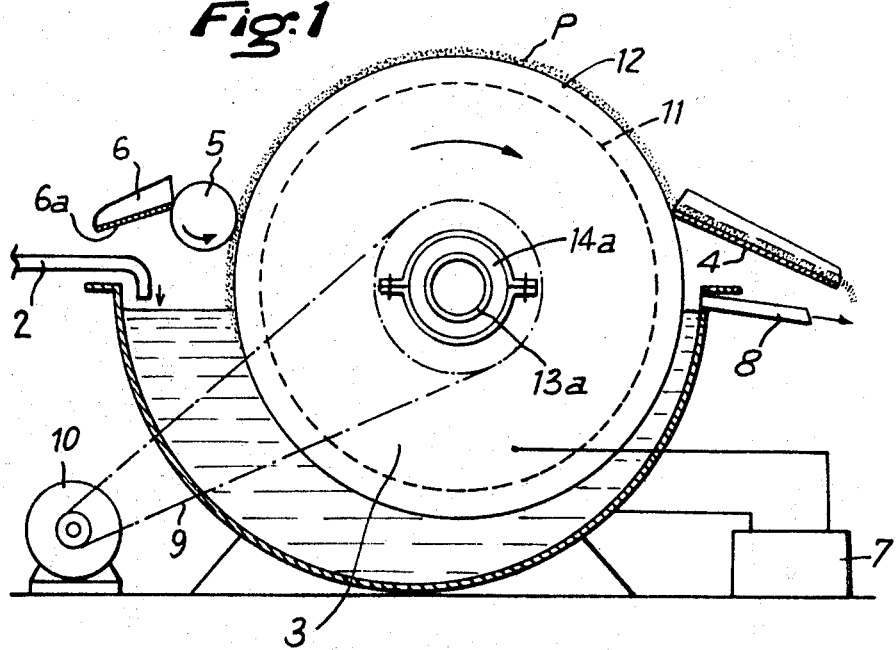
FIG. 1 is a schematic diagram of an apparatus according to a preferred embodiment of the invention.

The apparatus shown in FIG. 1 comprises essentially a receiving vessel 1 into which the liquid dispersion to be treated is conveyed by line 2, a main rotatable cylinder or drum 3 provided with a scraper 4, a satellite checkroller 5, itself provided with a scraper 6 and a continuous voltage generator 7. Vessel 1, in the preferred embodiment described, is semicylindrical, and the cylinder 3 is mounted eccentrically with respect to the vessel 1 such that the distance between the cylinder and the vessel decreases progressively from feed line 2 up to an evacuation line 8 for liquid from which solid particles have been removed. As will be explained later, this particularity improves the operation of the apparatus: it is not however indispensable, and the form of the vessel, as well as its arrangement with respect to the cylinder, may be modified.

Cylinder 3 is driven into rotation, in the direction of the arrow, through a device shown schematically in the form of a belt 9 and a gear motor unit 10 equipped with a speed variator making it possible, for example, to adjust the speed of rotation to a value between 0.1 and 5 rounds/minute.

Vessel 1 and cylinder 3 are metallic and are linked to the two respective poles of generator of direct current 7, so as to constitute electrodes, respectively a cathode and an anode. The flanges of the cylinder are coated with an insulating material, so as to avoid the formation, at that point, of a deposit from the solid phase of the dispersion.

Figure 2:
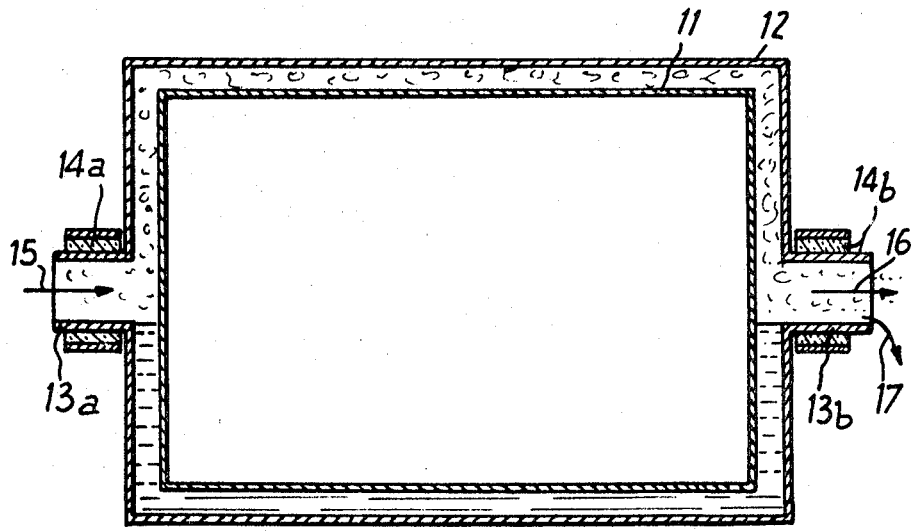
FIG. 2 is a longitudinal sectional view of a drying cylinder comprising part of this apparatus.

In the preferred embodiment described, the cylinder comprises, as shown more clearly in FIG. 2, a double jacket, the two walls 11–12 of which are made integral by means that are not shown. The two stub shafts 13a and 13b are mounted into insulating cushions 14a and 14b, supported, in a manner that is not shown, by the frame of the apparatus. These shafts are hollow and provide for the supply of heated steam at 15 and the evacuation of the latter at 16.

Stub shaft 14b has a larger diameter than stub shaft 14a, so that the water resulting from the condensation of the vapor in the lower immersed half of the cylinder can be evacuated at 17.

Heating of the cylinder may, in certain cases, be carried out in another way, for example, by means of hot air or electrical resistors or it can even be completely omitted in some applications.

Scrapers 4 and 6 are provided with evacuation spouts 4a and 6a respectively.

During operation, a film, symbolized in FIG. 1 by a dotted line P, forms on the emerged part of the cylinder surface. In a conventional drying cylinder, a film on the emerged part of the cylinder surface forms as well, but the latter, resulting from a simple adsorption phenomenon, has of course the same concentration as that of the dispersion to be treated, so that drying requires a considerable supply of heat to evaporate the liquid phase.

In the apparatus described, on the contrary, the film formed has already lost through being deposited electrophoretically the greater part of the liquid phase contained in the dispersion.

In order to define ideas more precisely, reference is now made to the case of a clay barbotine. The micelles, carrying a negative charge are attracted on the electropositive surface of the cylinder and furthermore, deposit by crowding together and orienting themselves as a result of the action of the electric field. In practice, besides combined water, this deposit contains little water other than that adsorbed onto the surface of the micelles, so that film P, obtained from a barbotine containing for example 50 percent water, does not contain more than 12 to 20 percent water, a certain part of which, will by the way be found on the outside surface of the film and will finally be eliminated by satellite roller 5. It can be seen, indeed, during the operation of the apparatus, that this satellite roller is coated with a clear water layer, which scraper 6, furthermore, eliminates as it is formed.

Satellite roller 5 is, of course, in contact with the main cylinder which ensures its drive in the reverse direction, but the contact pressure must be adequately adjusted so that the satellite roller does not excessively crush the semisolid film while regulating its thickness.

The dry product is evacuated through spout 4a, while the clear liquid is evacuated at 8. The barbotine evidently becomes particularly depleted in solid phase in the region of the vessel opposite feed line 2. It is advantageous, in this region to reduce the distance between the electrodes, in order to increase the electric field so as to provide favorable conditions for the electrophoretic deposit from a depleted dispersion.

Film P, although appreciably thicker than the one formed on the surface of a conventional drying cylinder, undergoes, through evaporation on the surface of the cylinder, very rapid and very efficient drying, which requires, even in the most difficult cases, but a low heat supply. This is due, not only to the fact that a large part of the water was previously separated through a process of electrophoresis and therefore does not need to be evaporated, but furthermore, to the surprising fact that the deposited film shows, thanks to the particle settling and classification phenomenon mentioned above, an exceptionally favorable thermal conductivity.

In the most interesting case of clay treatment, it has been observed that there is a surprising convergence of favorable factors: indeed, a strong electrolyte (generally basic) is added to these barbotines, as indicated in Example 1, which is chosen so as to impart, by defloculation, a viscosity to the barbotine which is sufficiently low so as to make it possible to carry out certain subsequent operations, such as sifting.

Now, we are aware that the value of the pH of the barbotine and the nature of the electrolyte chosen corresponding to the minimal viscosity, are precisely the most favorable for obtaining a very dense deposit with a very tough texture. This pH ranges from 7 to 8. In the treatment of clay barbotines, these conditions will therefore be chosen, and it turns out that the dry solids concentration of the product obtained and its viscosity will precisely be those which are best adapted for carrying out the subsequent operations. Furthermore, the orientation of the particles in the deposit by the action of the electric field gives a dry product which is particularly dense and homogeneous, which is very favorable for carrying out the subsequent treatments. Among the convergent favorable factors coming into play in the treatment of clay barbotines, nascent oxygen evolution at the anode should also be mentioned; this nascent oxygen, which is very active, oxidizes and destroys organic matter in the clay; furthermore, as it passes through film P, it gives rise to microcanals which enhance evaporation.

In certain other applications, the procedure will start, on the contrary, with a nondefloculating low concentration dispersion, but whose viscosity is relatively high: in this case, the electrophoretic deposit will be less dense and relatively labile, but, on the other hand, the electrophoretic separation power will be larger than in the preceding case: a separation will occur in the vessel between a pure liquid phase and a concentrated dispersion. In the final analysis, depending on the results aimed at, the pH and the viscosity of the dispersion will be varied by addition of appropriate electrolytes, which is discussed in the example given later: it should be observed that the major part of these electrolytes will remain in the liquid phase and will therefore not be incorporated into the dry product. The liquid phase will be advantageously recovered in order to prepare the next batch.

Furthermore, the density and texture of the deposit will be varied by choosing a specific concentration of the dispersion to be treated; a very concentrated dispersion being favorable for obtaining a dense and tough deposit, provided its viscosity is low. Another parameter to be taken into consideration in carrying out the process is the difference in potential applied between the electrodes which ranges from 0.5 to 150 volts, depending on the conductivity of the dispersion. The optimum intensity ranges from 0.5 to 5 amperes per square decimeter of mobile electrode surface. Finally, the setting of the rate of rotation of the cylinder makes it possible, by determining the residence time in the barbotine, to obtain a deposit whose thickness is optimum as a function of contemplated applications while the setting of the heat supply affects the moisture content of the final product.

In certain applications, the dehydrating operation will have to be carried out under vacuum, FIG. 3 shows a diagram of an installation comprising, besides vessel 1 and cylinder 3, provided with its satellite roller 5, and its scraper, these components, identical to those of FIG. 1, being shown in a simplified manner, a semicylindrical hood 18 attached at 19 and 20 to vessel 1 so as to constitute a leakproof enclosure. This enclosure is evacuated by means of a vacuum pump 21, a condenser 22 being inserted between the pump and the enclosure.

Feeding of the vessel with the dispersion to be treated and evacuation of the clear liquid are effected by means of proportioning pumps 23a and 23b, while evacuation of the dry product is effected through a rotating valve 24.

In certain cases, the installation will operate in an inert atmosphere, an inert gas being then introduced into the leakproof enclosure.

It must be well understood that the apparatus described can be varied so as to fit certain applications. It might be possible, in particular, to contemplate replacing the cylinder by a mobile electrode having a plane or, helical surface.

Figure 5:
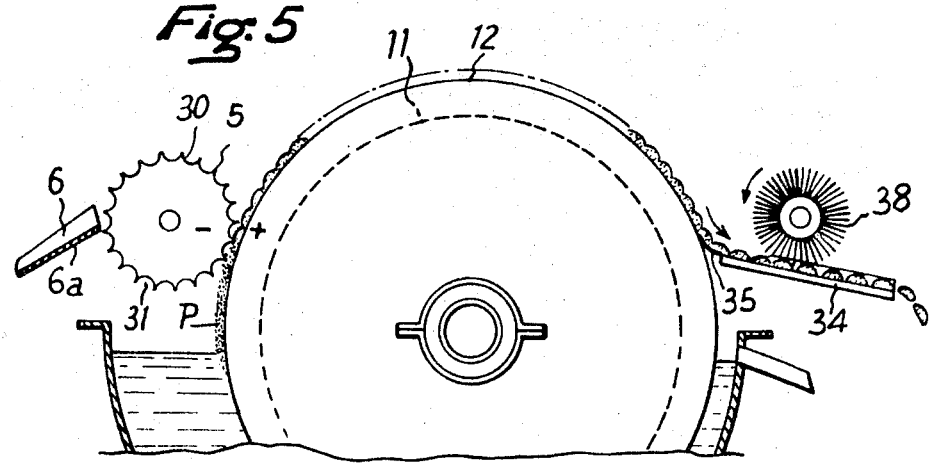
Figure 7:
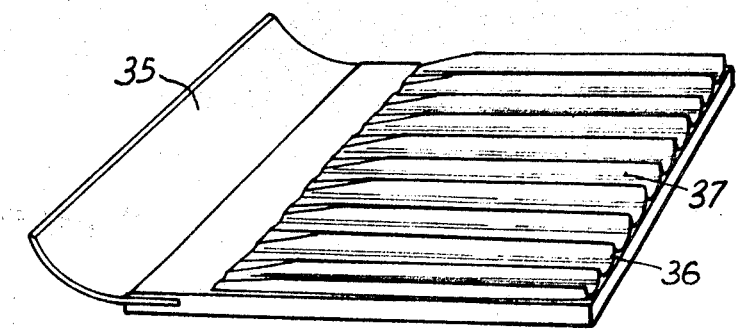
FIG. 7 shows one of the scrapers which is comprised in the said apparatus.

FIG. 5 shows an alternative embodiment of the satellite roller and of the scraping and dry product collecting device included in the apparatus according to FIG. 1. The thus modified apparatus is more particularly designed to obtain a dry product in the form of granules.

In the previous art, the granulation of a particulate solid product dispersed in a liquid phase is generally carried out in two consecutive cyclic stages: the first stage consists in extracting a dry product, for example, by passing through a filter press followed by drying in an oven, or by direct drying by means of a drying cylinder; the second stage consists, for example, in milling and sifting the dry product and leads to a large percentage of material which does not have the particle size distribution and other required properties and which must be redispersed so as to reextract the dry product. Other known methods also require a long and costly recycling of the waste material.

An important advantage of the dehydrating process according to the invention resides in the fact that it makes it possible to obtain the dry product directly in the form of particles of suitable size and density simply by providing discontinuities onto the electrode surface on which the film deposits or onto that of the auxiliary system which presses the latter so that scraping of this surface separates said film into granules.

Figure 6:
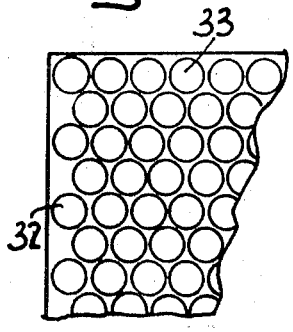
FIG. 6 is a developed view of a portion of the surface of the satellite roller comprised in the apparatus of FIG. 5.

In the preferred embodiment illustrated in FIG. 5, the surface of satellite roller 5 exhibits discontinuities and the latter are purely mechanical, consisting of alveoles depressing, e.g., circular depressions, distributed according to a predetermined pattern, such as 30–31 (FIG. 5)—32–33 (developed view of a portion of the roller surface: FIG. 6). Furthermore, scraper 34 which cooperates with cylinder 3 comprises a curved terminal portion 35 while the remaining surface is provided with corrugations such as 36–37 (FIG. &) whose heights progressively decrease in the direction of curved portion 35. A tough-haired cylindrical brush 38, driven into rotation in the direction of the arrow, by means not shown, around an axis parallel to that of cylinder 3, cooperates with the corrugated surface of the scraper.

The remainder of the apparatus corresponds to the detailed description given by referring to FIG. 1; in any case, satellite roller 5 is connected to the negative pole of generator 7 so as to constitute a second cathode.

In operation, film P is formed in the manner explained by referring to FIG. 1, but due to the presence of alueoles, it exhibits hemispheric raised portions, which are their complementaries, arranged as shown in FIG. 6, in rows parallel to elongated grooves formed by the corrugations of the scraper. Upon scraping, each row enters into one of these grooves and brush 38 divides it into hemispheric fragments which constitute the granule that is finally collected.

Roller 5, which constitutes a cathode, repels the micelles of the barbotine, and thus remains perfectly clean.

Figure 8:
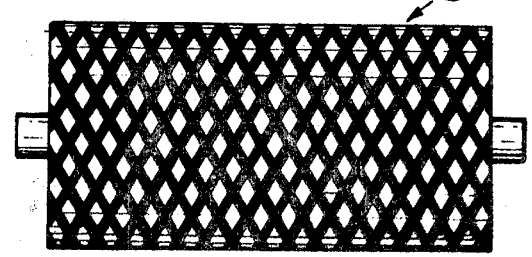
FIG. 8 shows a modified embodiment of the drying cylinder which is comprised in the said apparatus. The same reference numbers refer to homologous components in the various figures.

It must be well understood that the circular shape of the discontinuities shown in FIG. 6 is by no means restrictive, and that the latter will not necessarily be placed on the satellite roller. Furthermore, the mechanical discontinuities can, in certain cases, be replaced with electrical discontinuities, as illustrated in FIG. 8. The latter shows how the surface of cylinder 3, may be designed, with a view to collecting, without any further modification of this apparatus, granules having a specific geometrical form.

The parts shown in black are insulating, while the light parts are conducting, so that the deposit forms solely on the light parts of the grid, and therefore upon scraping separates into grains.

The grid can be formed, either by introducing recesses, which are subsequently filled with an insulating substance, for example, an epoxy resin, or by incorporating conducting contacts into a cylinder made of insulating material. The direct granulation process, whose application has just been described, is workable due to the fact that the film formed on the apparatus according to the invention can reach, in a single revolution of the cylinder, a much larger thickness than that formed on a conventional drying cylinder, and due to the fact that it is obtained, not only in the appropriate thickness, but also with the density and toughness suitable for the direct formation of the granule without any further milling or sifting. These different parameters may, furthermore, be adjusted by means indicated above in order to obtain a granule according to the desired specifications. In particular, the particle size distribution will vary directly with the speed of rotation of the cylinder. In order to obtain a film suitable for granulation, it is indispensable to provide a supply of heat to the cylinder, but this thermal supply will be, for reasons already given, much less than in conventional processes.

It should be noted that this granulation process can be applied even to abrasive products, which are very difficult to treat by means of the usual processes.

A certain number of concrete examples for the application of the dehydrating process described above will now be given.

EXAMPLE 1

This example relates to the dehydrating of various clay barbotines prepared with a view to producing a pure and dry clay capable of undergoing subsequent operations pertaining to each user industry. 0.1 percent of a mixture, consisting of equal parts of sodium pyrophosphate and sodium carbonate, is introduced into a 30 to 50 percent solid phase barbotine.

This mixture changes the pH of the barbotine and induces its defloculation which imparts to it a sufficiently low viscosity for certain subsequent operations to be carried out, for example, such as sifting.

The barbotine is then introduced into the apparatus of FIG. 1, the voltage applied to the electrodes being of the order of 18 to 20 volts, with an intensity of 1 to 1.5 amperes per $dm^2$ of anodic surface (cylinder 3) and cylinder 3 rotating at a speed ranging from 10 to 20 rounds/minute.

The rate of deposit ranges from 3 to 3.5 Kg./hour per square decimeter of anodic surface. A cylinder 1 meter in diameter and 2 meters long, for example, is used, in order to obtain approximately 2 tons of dry product per hour. In order to obtain a dry product containing 1 to 2 percent water, the consumption of energy, for each Kilog. of dry product, is of the order of 7 watt-hour for the production of the electric field and of 120 kilocalories for heating the cylinder.

As already indicated, the nascent oxygen discharged at the anode (i.e., on the surface of cylinder 3) burns off i.e., oxidizes the organic impurities contained in the clay, which is very valuable where kaolin is involved, the latter being bleached as a result.

EXAMPLE 2

The aqueous ceramic masses to be mixed in the manufacture of earthenware, must have, after dehydration, a moisture content of the order of 18 to 22 percent. 0.15 percent of a mixture, containing equal parts of sodium pyrophosphate and of sodium tri-polyphosphate, are added to a barbotine containing 50 to 60 percent solid phase and it is then introduced into the apparatus of FIG. 1, between whose electrodes is applied a voltage ranging from 12 to 15 volts, with an intensity of 0.8 to 1 ampere per square decimeter of anodic surface (cylinder 3).

The rate of deposit is 4.5 Kg./hour/$dm.^2$ of final product containing 20 percent water. In this case, it is not necessary to heat the cylinder and the energy consumption is reduced to 5 kilowatt-hour per ton of dry product, this energy being consumed by electrophoresis.

EXAMPLE 3

The sulfur to be used in the treatment of vines is usually prepared by the wet method. An aqueous slurry is obtained which will be advantageously dehydrated by passing it through the apparatus of FIG. 1. The voltage applied to the electrodes ranges from 30 to 35 volts, with an intensity of 2 to 4 amperes per square decimeter of anodic surface (cylinder 3). The rate of deposit is of the 35 of 2.2 kg./$dm.^2$/hour. This electrophoretic deposit (film P) contains 25 to 30 percent water, of which the major part is eliminated by drying, cylinder 3 being heated at a temperature below 120° C. This heating consumes 550 kilocalories per Kilog. of dry product while the production of the electric field consumes 58 watts/hour per kilog. of dry product (containing, for example, 0.5 percent water).

EXAMPLE 4

A copper oxychloride aqueous slurry, prepared by the wet method, according to a conventional method, is introduced into the apparatus of FIG. 1 after addition of cellulose sulfite which acts as a defloculating agent.

The voltage applied to the electrode is of the order of 25 volts with an intensity of 2.5 amperes per square decimeter of anodic surface (cylinder 3). The rate of deposit is 2.8 kg./$dm.^2$/hour.

This electrophorectic deposit (film P) contains 22 percent water, of which the major part is eliminated by drying. Heating of cylinder 3 consumes 320 kilocalories per kilog. of dry product, while the production of the electric field consumes 23 watt-hour per kilog. of dry product (containing approximately 1 percent water).

EXAMPLE 5

The clays to be used for the filtration and bleaching of oils are, as is known, treated with sulfuric acid which activates them.

These activated clays in the form of aqueous slurries must be dehydrated, and this operation is particularly difficult due to the fact that the micelles are almost neutral, bearing, in fact generally, a very slight negative charge. According to the invention, dehydration is carried out by means of the apparatus of FIG. 1, to whose electrodes a voltage of the order of 300 to 400 volts is applied.

Due to this high voltage, in order to avoid a prohibitively high consumption, voltage impulses produced by a generator of a known type are used in this case.

EXAMPLE 6

The apparatus of the invention can be used for dehydrating polymers or copolymers, for example, emulsified or suspended polyvinyl chloride.

A voltage of the order of 20 to 25 volts, with an intensity of 2 to 3 amperes per square decimeter of anodic surface is used.

A final product containing 30 to 35 percent water is obtained, no supply of heat whatsoever being introduced into the apparatus.

EXAMPLE 7

Aluminium hydrate, prepared according to a conventional method in an aqueous medium containing a high concentration of sodium hydroxide, is treated by means of the apparatus according to the invention, with a voltage ranging from 0.2 to 0.8 volts and an intensity of 12 to 18 amperes per square decimeter of anodic surface.

A final product containing 30 to 35 percent water is obtained, without any supply of heat whatsoever being introduced into the apparatus.

EXAMPLE 8

The granulation of ceramic masses for the purpose of manufacturing porphyr-looking tiles is carried out by means of the apparatus of FIG. 5. 0.1 to 0.2 percent of the defloculating agent mentioned in Example 2, is added to the aqueous ceramic slurry to be treated before its introduction into the vessel of the apparatus.

The conditions for treatment and the performances are identical to those of Example 1, but the method is carried out starting with a barbotine containing 50 to 60 percent solid phase which promotes the formation of the high density deposit necessary for the granulation to take place properly in the apparatus.

What is claimed is:

1. An apparatus for the extraction and dehydration of a solid phase from a liquid dispersion thereof, said apparatus comprising:

a vessel for containing said dispersion, at least one rotative cylinder or drum having an imperforated surface portion thereof in contact with said dispersion, said surface portion of said rotative drum being electroconductive, whereby a layer containing the solid phase of said dispersion with a liquid film is formed on said surface portion of said drum;

a source of direct electric current wherein the one pole is attached to said vessel and the other pole is attached to said rotative drum, thereby applying electric current to said vessel, the dispersion contained therein and the surface portion of said rotative drum, whereby said layer formed on said drum comprises a concentrated solid phase electrostatic deposit with a liquid film at the outside surface thereof;

a satellite roller mounted in cooperation with said rotative drum so as to maintain a constant predetermined pressure thereon, said roller located substantially in the region of the drum surface where said drum surface emerges from said dispersion during rotation, whereby said liquid film is removed from said solid phase electrostatic deposit;

a scraper mounted in cooperation with said rotative drum for removing the resulting solid phase electrostatic deposit from said drum, said scraper located substantially in the region of the drum surface where said drum surface again enters said dispersion during rotation.

2. An apparatus as claimed in claim 1 wherein a second scraper is mounted in cooperation with said satellite roller for removing said liquid film therefrom.

3. An apparatus as claimed in claim 1 wherein said vessel is shaped as a half-cylinder having two lateral edges, a feed inlet for said dispersion located adjacent to said satellite roller, an exhaust outlet for said liquid phase located adjacent to said scraper, said inlet and outlet positioned at opposite lateral edges;

and said rotative drum mounted eccentrically with respect to said vessel, so that the distance from said rotative drum to said cylinder progressively decreases from said inlet to said outlet.

4. An apparatus as claimed in claim 1 wherein said rotative cylinder or drum contains a heating means therein.

5. An apparatus as claimed in claim 4 wherein said heating means comprises a double jacket and two hollow stub shafts at the respective ends of said rotative drum, and means for circulating a heating fluid through said hollow stub shafts and said double jackets thereby heating the surface portion of said rotative drum.

6. An apparatus as claimed in claim 5 wherein said rotating drum is provided with a plurality of depressions distributed according to a predetermined pattern whereby said resulting layer is granulated.

7. An apparatus as claimed in claim 6, wherein the said second scraper has a curved surface portion mounted for cooperation with the said rotative drum and a further surface portion, said further surface portion being provided with corrugations shaped as elongated channels and a rotative brush mounted for cooperation with the said channels.

8. An apparatus as claimed in claim 5 wherein said satellite roller is provided with a plurality of depressions distributed according to a predetermined pattern whereby said resulting layer is granulated.

9. An apparatus as claimed in claim 8 wherein the said second scraper has a curved surface portion mounted for cooperation with the said rotative drum and a further surface portion, said further surface portion being provided with corrugations shaped as elongated channels and a rotative brush mounted for cooperation with the said channels.

10. An apparatus as claimed in claim 1, wherein the said rotatable cylinder is provided with electroconductive and insulating areas shaped and distributed in accordance with a predetermined pattern whereby the said resulting layer is granulated.

* * * * *